United States Patent
Alazraki et al.

(10) Patent No.: US 10,419,312 B2
(45) Date of Patent: Sep. 17, 2019

(54) SYSTEM, DEVICE, AND METHOD FOR REAL-TIME CONFLICT IDENTIFICATION AND RESOLUTION, AND INFORMATION CORROBORATION, DURING INTERROGATIONS

(71) Applicant: MOTOROLA SOLUTIONS, INC., Chicago, IL (US)

(72) Inventors: Scott M. Alazraki, Davie, FL (US); Alejandro G. Blanco, Fort Lauderdale, FL (US); Craig Siddoway, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 247 days.

(21) Appl. No.: 15/464,565

(22) Filed: Mar. 21, 2017

(65) Prior Publication Data
US 2018/0278504 A1    Sep. 27, 2018

(51) Int. Cl.
*H04L 12/26*    (2006.01)
*H04L 29/06*    (2006.01)
(Continued)

(52) U.S. Cl.
CPC ...... *H04L 43/0823* (2013.01); *G06F 17/2211* (2013.01); *G06F 17/279* (2013.01);
(Continued)

(58) Field of Classification Search
CPC ... G06F 17/289; G06F 17/2795; G10L 15/26; G10L 25/57; H04L 12/1822; H04L 29/06; H04L 43/04
See application file for complete search history.

(56) References Cited

U.S. PATENT DOCUMENTS 8,765,083 B2 *   7/2014   Blair ..................... C12M 47/18
                                                       423/210
9,015,037 B2     4/2015   Myslinski
(Continued)

FOREIGN PATENT DOCUMENTS

EP              1645973 A2     4/2006
WO   PCT/SE2010/050548    *   5/2010
(Continued)

OTHER PUBLICATIONS

Collberg C S et al.: "Watermarking, tamper-proofing, and obfuscation—tools for software protection", IEEE Transations on Software Engineering, IEEE Service Center, Los Almitos, CA, US, vol. 28, No. 8, Aug. 1, 2002, pp. 735-746.
(Continued)

*Primary Examiner* — Chirag R Patel
(74) *Attorney, Agent, or Firm* — Raguraman Kumaresan (57) ABSTRACT

A process for improved real-time conflict identification and resolution, and information corroboration, during an interrogation relative to an incident includes capturing a first real-time digital audio or video stream from a first interviewee under interrogation by a first interviewer relative to an incident. The first real-time digital audio or video stream is converted to a first digital text string, which is then semantically processed to identify and store first information relative to the incident. Stored second information created via interrogation of a second interviewee under interrogation relative to the incident is accessed, and a conflict between the stored first information and the stored second information is identified. A visual or audio prompt is generated associated with the conflict and an indication of the conflict is played back via the visual or audio prompt to the first interviewer.

21 Claims, 4 Drawing Sheets

(51) Int. Cl.
*H04L 12/18* (2006.01)
*G06F 17/22* (2006.01)
*G06F 17/27* (2006.01)
*G10L 25/57* (2013.01)
*G10L 15/26* (2006.01)

(52) U.S. Cl.
CPC ...... *G06F 17/2785* (2013.01); *H04L 12/1822* (2013.01); *H04L 43/04* (2013.01); *H04L 65/607* (2013.01); *G10L 15/26* (2013.01); *G10L 25/57* (2013.01)

(56) References Cited

U.S. PATENT DOCUMENTS

| | | | |
|---|---|---|---|
| 2013/0054612 A1 | 2/2013 | Danielyan et al. | |
| 2014/0244524 A1* | 8/2014 | Brestoff | G06Q 50/18 705/311 |
| 2016/0307563 A1 | 10/2016 | Shrivastava et al. | |
| 2017/0061544 A1* | 3/2017 | McClain | G06Q 40/08 |
| 2018/0114039 A1* | 4/2018 | Sion | G09C 1/00 |
| 2018/0157601 A1* | 6/2018 | Bryant | G06F 12/12 |

FOREIGN PATENT DOCUMENTS

WO 2014197669 A1 12/2014
WO 2015025189 A1 2/2015

OTHER PUBLICATIONS

The International Search Report and the Written Opinion corresponding patent application No. PCT/US2018/022638 filed Mar. 15, 2018, dated May 30, 2018, all pages.

Radev & McKeown, "Generating Natural Language Summaries from Multiple On-Line Sources", Journal Computational Linguistics—Special issue on natural language generation, vol. 24, Issue 3, Sep. 1998, pp. 470-500.

White, Cardie, & Ng, "Detecting Discrepancies in Numeric Estimates when Using Multidocument Hypertext Summaries", Proceedings HLT '02 Proceedings of the Second International Conference on Human Language Technology Research, San Diego, California, Mar. 24-27, 2002, pp. 336-341.

Andreas Rücklé, "Real-Time Summarization of Big Data Streams", Master Thesis, Technische Universität Darmstadt, Dec. 2015, all pages.

* cited by examiner

SYSTEM, DEVICE, AND METHOD FOR REAL-TIME CONFLICT IDENTIFICATION AND RESOLUTION, AND INFORMATION CORROBORATION, DURING INTERROGATIONS

BACKGROUND OF THE INVENTION

Tablets, laptops, phones, mobile or portable radios, and other mobile computing devices are now in common use by users, such as government officers (including firemen, police officers, and paramedics, among others), and provide such users with instant access to increasingly valuable additional information and resources such as vehicle histories, arrest records, outstanding warrants, health information, and other information that may aid the user in making a more informed determination of an action to take or how to resolve a situation, among other possibilities. Body cameras are also starting to be deployed to capture events and environments around officers as they complete their assigned tasks and perform other functions. And government offices, including police stations, are being outfitted with fixed cameras and computing device to capture and store relevant audio and/or video.

One function that many government officers may regularly perform is an information gathering function (i.e., when questions are posed by voice to an interviewee and generally referred to hereinafter as an interrogation). This information gathering function may take the form of an informal conversation at a government building, at an interviewee's car or house, or at some other location. Additionally or alternatively, the information gathering function could take the form of a more formal conversation of one or more suspects or witnesses in one or more specialized interrogation rooms at a police station. Whether the information gathering function environment is informal or formal, or where the interrogation takes place, it is important that the information gathered from an interrogation is accurate and timely. Conventionally, government officers may perform the information gathering function a number of times with a number of interviewees over a span of several days or weeks, and only sometime thereafter begin to compare and cross-reference information provided through those information gathering efforts. However, this post-interview manual comparing and cross-referencing function is time consuming for the officer and the delay in performing the comparing and cross-referencing negatively impacts the officer's ability to ask follow-up questions and further impacts an interviewee's ability to accurately recall details from an event or incident when and if the officer subsequently returns with follows-up questions at some later point in time.

Thus, there exists a need for a technical method, device, and system for improved real-time conflict identification and resolution, and information corroboration, during an interrogation relative to an incident.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is a method, device, and system for improved real-time conflict identification and resolution, and information corroboration, during an interrogation relative to an incident.

In one embodiment a process for improved real-time conflict identification and resolution during an interrogation relative to an incident includes: capturing, at an audio and/or video capture device communicatively coupled to a computing device, a first real-time digital audio or video stream from a first interviewee under interrogation by a first interviewer relative to an incident; converting, by the computing device, the first real-time digital audio or video stream to a first digital text string; semantically processing, by the computing device, the first digital text string to identify first information relative to the incident and storing the first information; accessing, by the computing device, stored second information created via semantic processing of a second digital text string converted from a second digital audio or video stream captured via interrogation of a second interviewee under interrogation relative to the incident; and identifying, via the computing device, a conflict between the stored first information and the stored second information relative to the incident, and responsively generating a visual or audio prompt, via a corresponding display or audio-output device communicatively coupled to the computing device, and playing back an indication of the conflict via the visual or audio prompt to the first interviewer.

In a further embodiment, a computing device for providing improved real-time conflict identification and resolution during an interrogation relative to an incident includes: a memory storing non-transitory computer-readable instructions; a transceiver; and one or more processors configured to, in response to executing the non-transitory computer-readable instructions, perform a first set of functions comprising: capture, via an audio and/or video capture device communicatively coupled to the computing device, a first real-time digital audio or video stream from a first interviewee under interrogation by a first interviewer relative to an incident; convert the first real-time digital audio or video stream to a first digital text string; semantically process the first digital text string to identify first information relative to the incident and store the first information; access stored second information created via semantic processing of a second digital text string converted from a second digital audio or video stream captured via interrogation of a second interviewee under interrogation relative to the incident; and identify a conflict between the stored first information and the stored second information relative to the incident, and responsively generate a visual or audio prompt, via a corresponding display or audio-output device communicatively coupled to the computing device, and play back an indication of the conflict via the visual or audio prompt to the first interviewer.

Each of the above-mentioned embodiments will be discussed in more detail below, starting with example communication and device architectures of the system in which the embodiments may be practiced, followed by an illustration of processing steps for achieving a method, device, and system for improved real-time conflict identification and resolution, and information corroboration, during an interrogation relative to an incident. Further advantages and features consistent with this disclosure will be set forth in the following detailed description, with reference to the figures.

1. Communication System and Device Structures

Figure 1:
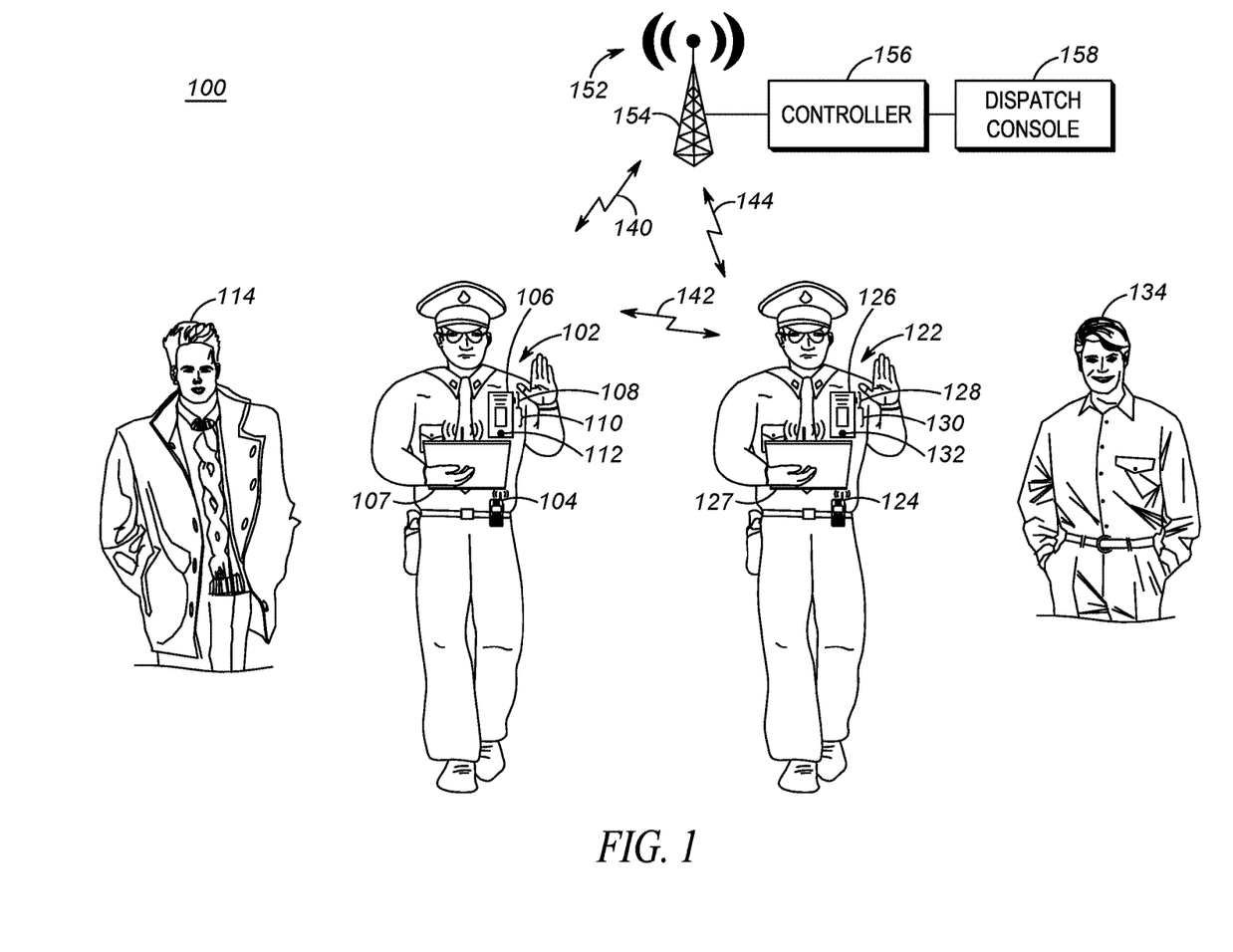
FIG. 1 is a system diagram illustrating a device and system for improving real-time conflict identification and resolution during an interrogation relative to an incident, in accordance with some embodiments.

Referring now to the drawings, and in particular FIG. 1, a communication system diagram illustrates a system 100 of devices including a first set of devices that a first user 102 (illustrated in FIG. 1 as a first responder police officer) may wear, a second set of devices that a second user 122 (illustrated in FIG. 1 as a second responder police officer) may wear, and a wireless infrastructure radio access network (RAN) 152. The first set of devices may include a first primary battery-powered portable radio 104 used for narrowband and/or broadband direct-mode or infrastructure communications, a first battery-powered radio speaker microphone (RSM) video capture device 106, and/or a first tablet device 107 having an integrated video camera and used for data applications such as incident support applications. A second set of devices may include a second primary battery-powered portable radio 124 used for narrowband and/or broadband direct-mode or infrastructure communications, a second battery-powered RSM video capture device 126, and/or a second tablet device 127 having an integrated video camera and used for data applications such as incident support applications.

Each of the first and second portable radios 104, 124, first and second RSM video capture device 106, 126, and first and second tablet devices 107, 127 may be capable of directly wirelessly communicating via a direct-mode wireless link 142, and/or may be capable of wirelessly communicating via the wireless infrastructure RAN 152 over respective wireless link(s) 140, 144. In some embodiments, the wireless link(s) 140, 142, 144 may be replaced by wired ad-hoc or infrastructure links, such as an Ethernet link, a USB link, or similar link configurable to communicate via a twisted pair wire, a coaxial cable, a fiber-optic link, or a similar physical connection via a wireline network, and each of the first and second portable radios 104, 124, first and second RSM video capture device 106, 126, and first and second tablet devices 107, 127 may be capable of directly wiredly communicating via a wired link, and/or may be capable of wiredly communicating via infrastructure wired links.

The first and second portable radios 104, 124 may be any mobile computing device used for infrastructure RAN or direct-mode media (e.g., voice, audio, video, etc.) or control signal communication via a long-range wireless transmitter and/or transceiver that has a transmitter transmit range on the order of miles, e.g., 0.5-50 miles, or 3-20 miles (e.g., in comparison to a short-range transmitter such as a Bluetooth, Zigbee, or NFC transmitter) with other mobile computing devices and/or the infrastructure RAN 152. The long-range transmitter may implement a conventional or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE) protocol including multimedia broadcast multicast services (MBMS), an open mobile alliance (OMA) push to talk (PTT) over cellular (OMA-PoC) standard, a voice over IP (VoIP) standard, or a PTT over IP (PoIP) standard. In still further embodiments, the long range transmitter may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard. Other types of long-range wireless protocols could be implemented as well. In the example of FIG. 1, the portable radios 104, 124 may form a hub of communication connectivity for the respective user 102, 122, through which other accessory devices, such as biometric sensors, activity trackers, weapon status sensors, heads-up-displays, respective RSM video capture devices 106, 126, and/or respective tablet devices 107, 127 may communicatively couple.

In order to communicate with and exchange video, audio, and other media and communications with the respective RSM video capture device 106, 126 and/or the respective tablet devices 107, 127, the portable radios 104, 124 may further contain one or more physical electronic ports (such as a USB port, an Ethernet port, an audio jack, etc.) for direct electronic coupling with the respective RSM video capture device 106, 126 or respective tablet devices 107, 127 device, and/or may contain a short-range transmitter (e.g., in comparison to the long-range transmitter such as a LMR or Broadband transmitter) and/or transceiver for wirelessly coupling with the respective RSM video capture device 106, 126 or respective tablet devices 107, 127 device. The short-range transmitter may be a Bluetooth, Zigbee, or NFC transmitter having a transmit range on the order of 0.01-100 meters, or 0.1-10 meters. In other embodiments, the RSM video capture devices 106, 126 and/or tablet devices 107, 127 may contain their own long-range transceivers and may communicate with one another and/or with the infrastructure RAN 152 directly without passing through respective portable radios 104, 124.

The respective RSM video capture devices 106, 126 provide voice functionality features similar to a traditional RSM, including one or more of acting as a remote microphone that is closer to the respective user's 102, 122 mouth and for recording ambient audio including interviewee voice audio, providing a remote speaker allowing play back of audio closer to the user's 102, 122 ear, and including a push-to-talk (PTT) switch or other type of PTT input. The voice and/or audio recorded at the remote microphone may be provided to the respective portable radio 104, 124 for storage and/or further analysis or for further transmission to other mobile communication devices or the infrastructure RAN 152 or may be directly transmitted by the respective RSM video capture device 106, 126 to other mobile computing devices or the infrastructure RAN 152. The voice and/or audio played back at the remote speaker may be received from the respective portable radio 104, 124 or received directly from one or more other mobile computing devices or the infrastructure RAN 152. The RSM video capture devices 106, 126 may include a separate physical PTT switch 108, 128 that functions, in cooperation with the respective portable radio 104, 124 or on its own, to maintain the portable radio 104, 124 and/or RSM video capture device 106, 126 in a monitor only mode, and which switches the device to a transmit-only mode (for half-duplex devices) or transmit and receive mode (for full-duplex devices) upon depression or activation of the PTT switch 108, 128. The portable radio 104, 124 and/or respective RSM video capture device 106, 126 may form part of a group communications architecture that allows a single mobile computing device to communicate with one or more group members (not shown) associated with a particular group of devices at a same time.

Additional features may be provided at the RSM video capture devices 106, 126 as well. For example, display screens 110, 130 may be provided for displaying images, video, and/or text to the respective user 102, 122. The display screen 110, 130 may be, for example, a liquid crystal display (LCD) screen or an organic light emitting display (OLED) display screen. In some embodiments, a touch sensitive input interface may be incorporated into the display screen 110, 130 as well, allowing the respective user 102, 122 to interact with content provided on the display screen 110, 130. A soft PTT input may also be provided, for example, via such a touch interface.

A video camera 112, 132 may also be provided at each respective RSM video capture device 106, 126, integrating an ability to capture images and/or video and store the captured image data (for further analysis) or transmit the captured image data as an image or video stream to the respective portable radio 104, 124 and/or to other mobile computing devices or to the infrastructure RAN 152 directly. The video camera 112, 132 and RSM remote microphone may be used, for example, for capturing audio and/or video of an interviewee 114, 134 and the interviewee's surroundings, storing the captured image and/or audio data for further analysis or transmitting the captured image and/or audio data as a video and/or audio stream to the respective portable radio 104, 124 and/or to other mobile computing devices or to the infrastructure RAN 152 directly for further analysis commensurate with this disclosure.

Each tablet device 107, 127 may be any wired or wireless computing device used for infrastructure RAN or direct-mode media (e.g., voice, audio, video, etc.) communication via a long-range or short-range wireless transmitter or wired transmitter with other mobile computing devices and/or the infrastructure RAN 152. Each tablet device 107, 127 includes a display screen for displaying a user interface to an operating system and one or more applications running on the operating system, such as a broadband PTT communications application, a web browser application, an outstanding warrant database application, a mapping and/or navigation application, a health information database application, or other types of applications that may require user interaction to operate, including the steps and processes set forth herein. The tablet device 107, 127 display screen may be, for example, an LCD screen or an OLED display screen. In some embodiments, a touch sensitive input interface may be incorporated into the display screen as well, allowing the respective user 102, 122 to interact with content provided on the display screen. A soft PTT input may also be provided, for example, via such a touch interface.

Front and/or rear-facing video cameras may be provided at each tablet device 107, 127, integrating an ability to capture video and/or audio of the respective user 102, 122 and the user's 102, 122 surroundings, or a respective interviewee 114, 134 and the interviewee's surroundings, and store and/or otherwise process the captured video and/or audio for further analysis or transmit the captured video and/or audio as a video and/or audio stream to the respective portable radio 104, 124, to other mobile computing devices, and/or to the infrastructure RAN 152 for further transmission or analysis consistent with this disclosure.

Although RSMs 106, 126 and tablet devices 107,127 are illustrated in FIG. 1 as providing example video cameras and/or microphones for generating audio and/or video streams for use in real-time conflict identification and resolution during an interrogation relative to an incident, in other embodiments, other types of cameras and/or microphones could be used as well, including but not limited to, portable stand-alone video cameras and/or microphones, security cameras and/or microphones, air-based drone-attached video cameras and/or microphones, or other types of audio and/or video recording devices with an integrated computing device consistent with this disclosure or communicably coupled via a wired or wireless network interface to a computing device consistent with this disclosure. Furthermore, although RSMs 106, 126 and tablet devices 107, 127 are described above with respect to a single video capture element and single microphone, in other embodiments, each RSM 106, 126 and/or tablet device 107, 127 may include an array of video capture elements and/or microphones for capturing video and/or audio of multiple suspects or targets under interrogation simultaneously, among other possibilities.

Infrastructure RAN 152 may implement over wireless link(s) 140, 144 a conventional or trunked LMR standard or protocol such as DMR, a P25 standard defined by the APCO, TETRA, or other LMR radio protocols or standards. In other embodiments, infrastructure RAN 152 may additionally or alternatively implement over wireless link(s) 140, 144 an LTE protocol including MBMS, an OMA-PoC standard, a VoIP standard, or a PoIP standard. In still further embodiments, infrastructure RAN 152 may additionally or alternatively implement over wireless link(s) 140, 144 a Wi-Fi protocol perhaps in accordance with an IEEE 802.11 standard (e.g., 802.11a, 802.11b, 802.11g) or a WiMAX protocol perhaps operating in accordance with an IEEE 802.16 standard. Other types of wireless protocols could be implemented as well. The infrastructure RAN 152 is illustrated in FIG. 1 as providing coverage for the portable radios 104, 124, RSM video capture devices 106, 126, and tablet devices 107, 127 via a single fixed terminal 154 coupled to a controller 156 (e.g., radio controller, call controller, PTT server, zone controller, MME, BSC, MSC, site controller, Push-to-Talk controller, or other network device) and including a dispatch console 158 operated by a dispatcher.

The controller 156 illustrated in FIG. 1 may additional or alternatively operate as a back-end audio and/or video processing electronic computing device or remote cloud-based storage device consistent with the remainder of this disclosure.

Figure 2:
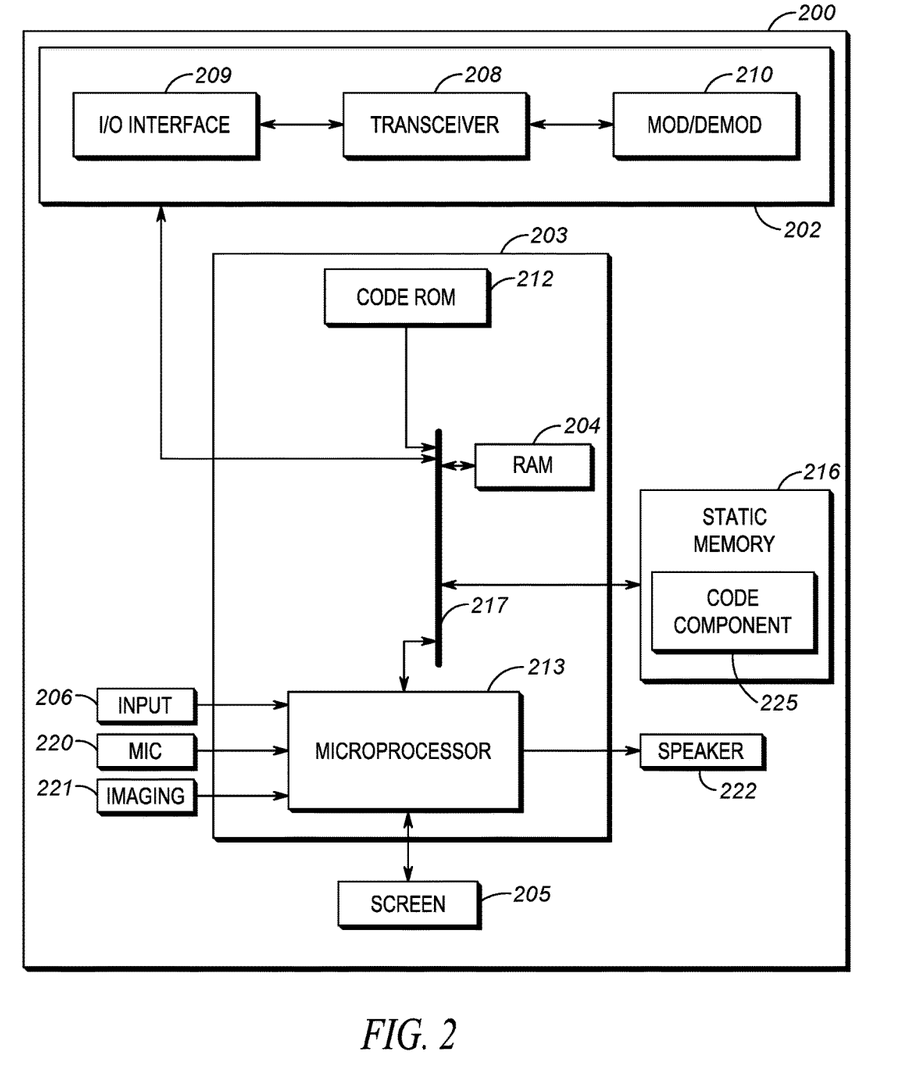
FIG. 2 is a device diagram showing a device structure of a computing device of FIG. 1 in accordance with some embodiments.

Referring to FIG. 2, a schematic diagram illustrates a computing device 200 according to some embodiments of the present disclosure. Computing device 200 may be, for example, the same as or similar to one of the portable radios 104, 124, one of the RSM video capture devices 106, 126, one of the tablet devices 107, 127, or the controller 156 of FIG. 1, and/or may be a distributed computing device across two or more of the foregoing and linked via a wired and/or wireless communication link(s). As shown in FIG. 2, computing device 200 includes a communications unit 202 coupled to a common data and address bus 217 of a processing unit 203. The computing device 200 may also include an input unit (e.g., keypad, pointing device, touch-sensitive surface, etc.) 206 and a display screen 205, each coupled to be in communication with the processing unit 203.

A microphone 220 may be present for capturing audio from a user (e.g., interviewer) and/or civilian (e.g., interviewee) that is further processed by processing unit 203 in accordance with the remainder of this disclosure and/or is transmitted as voice stream data by communication unit 202 to other portable radios and/or other electronic computing devices for further processing. An imaging device 221 may provide video (still or moving images) of an area in a field of view of the computing device 200 for further processing by the processing unit 203 and/or for further transmission by communications unit 202 and processing by other electronic computing devices. A communications speaker 222 may be present for reproducing audio that is decoded from voice streams of voice calls received via the communication unit 202 from other portable radios, from digital audio stored at the computing device 200, from other ad-hoc or direct mode devices, and/or from an infrastructure RAN device. Speaker 222 may also play back an indication of a conflict via an auditory prompt identifying a conflict between stored first information and stored second information relative to the incident consistent with this disclosure. The screen 205 may be present for indicating status of various computing device functions or features, for reproducing received text messages, or for playing back an indication of a conflict via a visual prompt identifying a conflict between stored first information and stored second information relative to the incident consistent with this disclosure.

The processing unit 203 may include a code Read Only Memory (ROM) 212 coupled to the common data and address bus 217 for storing data for initializing system components. The processing unit 203 may further include a microprocessor 213 coupled, by the common data and address bus 217, to a Random Access Memory (RAM) 204 and a static memory 216.

The communications unit 202 may include one or more wired or wireless input/output (I/O) interfaces 209 that are configurable to communicate with other devices, such as a portable radio, RSM, tablet, or wireless RAN.

The communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, a WiMAX transceiver perhaps operating in accordance with an IEEE 802.16 standard, and/or other similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The microprocessor 213 has ports for coupling to the input unit 206 and the microphone unit 220, and to the display screen 205, imaging device 221, and speaker 222. Static memory 216 may store operating code 225 for the microprocessor 213 that, when executed, performs one or more of the computing device steps set forth in FIG. 3 and accompanying text. Static memory 216 may also store, permanently or temporarily, first information relative to the incident generated by semantically processing a first digital text string and second information relative to the incident retrieved from another computing device, the second information generated by semantically processing a second digital text string.

Static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

Figure 3:
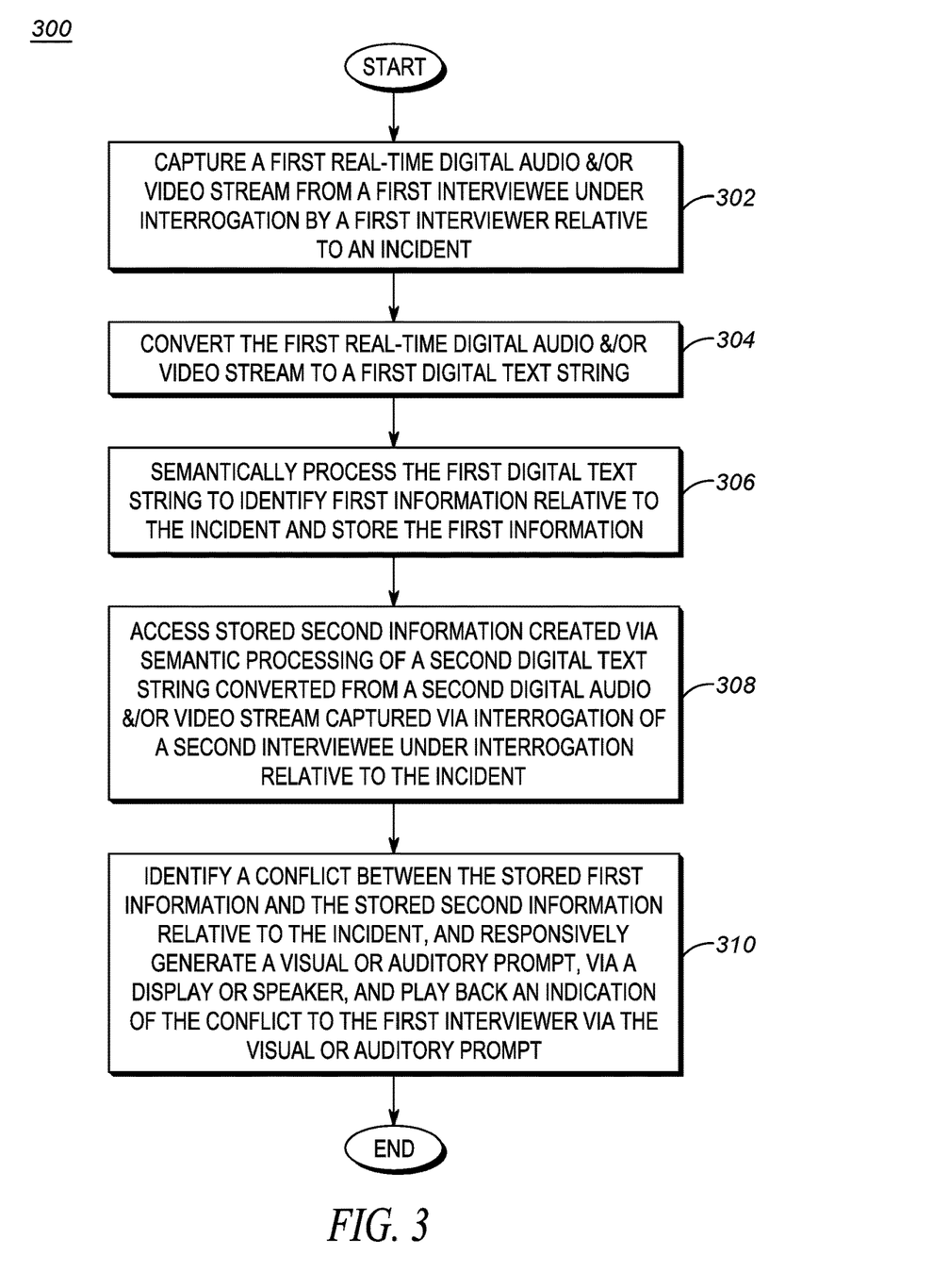
FIG. 3 illustrates a flow chart setting forth process steps for operating the computing device(s) of FIGS. 1 and/or 2 to improve real-time conflict identification and resolution during an interrogation relative to an incident, in accordance with some embodiments.

2. Processes for Improved Real-time Conflict Identification and Resolution, and Information Corroboration, During an Interrogation Relative to an Incident Turning now to FIG. 3, a flow chart diagram illustrates a method 300 for improved real-time conflict identification, and information corroboration, and resolution during an interrogation relative to an incident. While a particular order of processing steps, message receptions, and/or message transmissions is indicated in FIG. 3 for exemplary purposes, timing and ordering of such steps, receptions, and transmissions may vary where appropriate without negating the purpose and advantages of the examples set forth in detail throughout the remainder of this disclosure. The computing device may execute method 300 at power-on, at some predetermined periodic time period thereafter, in response to a trigger raised locally at the device via an internal process or via an input interface (e.g., the user enabling a particular feature associated with method 300 or the computing device detecting that the computing device has entered a particular area or that a user thereof has exited a particular area or vehicle, among other possibilities), or in response to detecting a trigger from a portable radio, RSM, tablet device, or infrastructure controller to which it is communicably coupled, among other possibilities.

The computing device executing method 300 may include an edge device same or similar to any one or more of the portable radios 104, 124, the RSMs 106, 126, or the tablet devices 107, 127 illustrated in FIG. 1, or may include an infrastructure device same or similar to the controller 156 of FIG. 1, among other possibilities. Accordingly, an imaging device generating the audio and/or video at step 302 may also be the device processing the audio and/or video, or the imaging device generating the audio and/or video at step 302 may wirelessly or wiredly transmit the generated audio and/or video to the computing device for further processing. For example, in one embodiment, the tablet device 107 of FIG. 1 may perform all steps of FIG. 1, while in other embodiments, the tablet device 107 may perform some portion of method 300 (such as steps 302-304, and 308-310), while infrastructure controller 156 performs a remaining portion of method 300 (such as step 306). Other combinations are possible as well.

Method 300 begins at step 302 where a computing device captures a first real-time digital audio and/or video stream from a first interviewee under interrogation by a first interviewer relative to an incident. The computing device may capture the audio and/or video stream via an integrated audio and/or video capture device, or via a wirelessly or wiredly coupled audio and/or video capture device. The computing device may cause the audio and/or video capture device to start recording in response to a trigger event, or may begin processing an already-being-captured audio and/or video stream in response to the trigger event and in accordance with the subsequent processing steps set forth in method 300 of FIG. 3. The trigger event may be generated in a number of ways, and may be detected by the computing device in a corresponding number of different ways. As a first example, a user 102 of FIG. 1, which may be a government officer/interviewer, may operate a user-interface of the computing device corresponding to a request to begin capturing audio and/or video of an interviewee under interrogation and the computing device may subsequently detect a generated trigger event as a result of the user-interface manipulation. The user-interface may include a physical user-interface such as a physical or touch-sensitive button particularly assigned to an interviewee capture process trigger and that, when manipulated by the user, generates the trigger event, or may include an audio/video interface in which a spoken command such as "begin recording" or a particular hand gesture associated with a command to "begin recording" is detected via audio and/or video analysis of an audio/video stream capture processed at the computing device.

In a second example, another computing device or accessory device communicatively coupled to the computing device, such as the portable radio 104, may generate a trigger event (via a corresponding user interface or some other input or event detection) and transmit a corresponding instruction to the computing device (perhaps operating as the RSM 106) such that, subsequent to receipt at the computing device, causes the computing device to detect the trigger event.

In any event, at step 302, the computing device captures, via an audio and/or video capture device, electronic audio and/or video capture of an interviewee and stores the audio and/or video capture for further processing.

In embodiments where the computing device communicates with the audio and/or video capture device via an ad-hoc wireless network, the computing device may discover available nearby audio and/or video capture devices via the ad-hoc wireless network by, for example, transmitting a wireless beacon containing information regarding a field of view needed, characteristics of the interviewee 114, location information of the user (e.g., the user 102 of FIG. 1), interviewee, and/or computing device, and/or other information, and may then monitor for responses from audio and/or video capture devices meeting the requested specifications. Additionally or alternatively, the computing device may have access to, locally or remotely, or may transmit a request for information from, a database of audio and/or video capture device locations that sets forth one or more of audio and/or video capture device locations, camera imaging parameters (resolution, light sensitivity, light range, focal distances, etc.), fields of view, availability, audio capture parameters (sensitivity, signal-to-noise ratio, directionality, etc.), and security access parameters. The database may be pre-populated manually, or may be dynamically created and/or updated as additional audio and/or video capture devices are added to the system and report their availability and one or more other parameters noted above to the local or remote database.

When identifying the one or more available audio and/or video capture devices having a field of view (or listening direction) that incorporates the interviewee, the computing device may use known location information of the computing device itself (e.g., as a proxy for a location of the interviewee) or known location information of a portable radio or mobile radio associated with the user. In some embodiments, the computing device may use orientation information of the user and an additional depth camera to estimate a location of the interviewee relative to the computing device, portable radio, or mobile radio. Still other mechanisms could be used to ensure that audio and/or video capture devices identified at step 302 most likely have a field of view (or listening direction) incorporating the interviewee.

In embodiments in which audio and/or video capture devices are identified that have a pan, tilt, zoom capability (PTZ), they may be controlled to adjust their field of view (or listening direction) to incorporate a location of the user and/or interviewee.

Once one or more audio and/or video capture devices are identified at step 302, and if not already being provided to the computing device, the computing device may request the one or more audio and/or video capture devices to begin providing a video stream and/or audio stream capture to the computing device for further processing. The request may involve a simple message requesting streaming to begin, or may involve a handshake process in which each audio and/or video capture device authenticates or otherwise authorizes the computing device to receive the stream(s), which may involve one or more third party or responder agency-owned authentication services. In situations where the one or more audio and/or video capture devices are in a power-saving or inactive mode, the request may inherently or explicitly include a request to exit the power-saving or inactive mode and enter a power-on mode and begin capturing video and/or audio of the interviewee.

For those audio and/or video capture devices already providing a video and/or audio stream to the computing device, the computing device may transition at step 302 from not processing the received video and/or audio stream relative to the real-time conflict identification and resolution process disclosed herein to actively processing the received video and/or audio stream relative to the real-time conflict identification and resolution process disclosed herein.

The audio and/or video stream may include a digital audio stream including an auditory record of questions asked by an interviewer such as respective user 102 or 122, and an auditory record of answers (to the questions posed by the interviewer) from an interviewee such as respective interviewee 114 and 134. Additionally or alternatively, the audio and/or video stream may include a visual representation of sign-language or other visual communication system representative of questions asked by an interviewer such as respective user 102 or 122, and a visual representation of sign-language or other visual communication system representative of answers (to the questions posed by the interviewer) from an interviewee such as respective interviewee 114 and 134. Other possibilities exist as well.

The captured audio and/or video stream may then be stored in non-volatile memory at the computing device and/or transmitted to other computing devices for further processing or further routing.

In some embodiments, the interviewer questions and interviewee answers (whether in audio or visual form) may be captured and stored at step 302 without separately identifying which auditory or visually captured content belongs to the interviewer and which auditory or visually captured content belongs to the interviewee. In other embodiments, the interviewer questions and interviewee answers (whether in audio or visual form) may be captured and stored at step 302 along with identifications of which auditory or visually captured content belongs to the interviewer and which auditory or visually captured content belongs to the interviewee. For example, an input interface at the computing device or at the audio and/or vide capture device may be used by the interviewer to provide the computing device an indication of which party is providing auditory or visual output for capture at any one time, and the computing device may process this information and store, integrated within the captured audio and/or video stream or via a separate associated metadata store, identifications of "speakers."

Additionally or alternatively, the computing device may apply a real-time or post-process function that automatically distinguishes between interviewer questions and interviewee answers in the captured audio and/or video stream, again integrated within the captured audio and/or video stream or via a separate associated metadata store. For example, the interviewee may be identified via a video portion of the audio and/or video stream as one taking at least one or more actions from a set of detectable actions or being in a detectable state associated with being an interviewee (such as being placed into a back seat of a police car, being handcuffed, having hands in the air or placed on a vehicle, taking a particular seat in a interrogation room, etc.). In other examples, the interviewee may be identified via a video portion of the audio and/or video stream by a process of elimination in which a user, first responder, or officer having a known uniform or other clothing or unique visual feature or auditory voice profile detectable via the video and/or audio is identified as the interviewer and eliminated from selection as the interviewee (the remaining identified person being identified as the interviewee).

In still other embodiments, an audio analysis function operating at the computing device (or at the audio and/or video capture device or at a remote device to which the computing device transmits the captured voice audio and a request to perform a voice audio recognition process) may perform a voice audio recognition process on captured voice audio of the audio portion of the audio and/or video stream, in comparison to a locally or remotely stored voice audio recognition database, and provide in return to the computing device an identity of the interviewer and/or interviewee (e.g., name or other unique governmental identifier). Accompanying the identify information may also be an indicator of whether the voice print is associated with a government officer, such as a police officer, which could then be used by default to identify the government officer as the interviewer and the remaining (identified or un-identified) voice as the interviewee.

Still further, uniquely identifiable content included in captured audio of the audio and/or video stream and directed at the interviewee may be provided to the computing device to aid in identifying the interviewee, such as voice audio including a detected providing of Miranda rights to identify the interviewer and a detected providing of an acknowledgment of the recited Miranda rights given by an interviewee to identify the interviewee. Still further, intonations detected in a captured audio stream of the audio and/or video stream may be used to identify a voice associated with the interviewer (e.g., the party asking the most or highest frequency of questions) and a second voice associated with the interviewee (e.g., the party providing the least or lowest frequency of questions). Other possibilities exist as well.

Various image and/or audio processing algorithms may be used to identify interviewer and interviewee in the one or more video and/or audio streams captured at step 302, including but not limited to geometric hashing, edge detection, scale-invariant feature transform (SIFT), speeded-up robust features (SURF), neural networks, deep learning, genetic, gradient-based and derivative-based matching approaches, Viola-Jones algorithm, template matching, image segmentation and blob analysis, a frequency estimation algorithm, a hidden Markov model algorithm, a Gaussian mixture model algorithm, a pattern matching algorithm, a neural network algorithm, a matrix representation algorithm, or a vector quantization algorithm. Other possibilities exist as well.

At step 304, the computing device converts the digital audio and/or video stream to a first digital text string. The digital text stream may include a text-based description of the audio and/or video from the audio and/or video stream, and may include, for example, text representative of the auditory record of questions asked by the interviewer such as respective user 102 or 122, and the auditory record of answers (to the questions posed by the interviewer) from the interviewee such as by respective interviewee 114 or 134. Additionally or alternatively, the digital text stream may include text representative of the visual representation (e.g., sign language, etc., as noted earlier) representative of questions asked by an interviewer such as respective user 102 or 122, and text representative of the visual representation of answers (to the questions posed by the interviewer) from the interviewee such as by respective interviewee 114 or 134. Various character encodings for the digital text streams may be used, such as a Unicode Transformation Format-based character encoding (UTF-8 or UTF-32) or an American Standard Code for Information Exchange (ASCII) based character encoding, among many other possibilities. The digital text stream may then be stored in non-volatile memory at the computing device and/or transmitted to other computing devices for further processing.

Figure 4A:
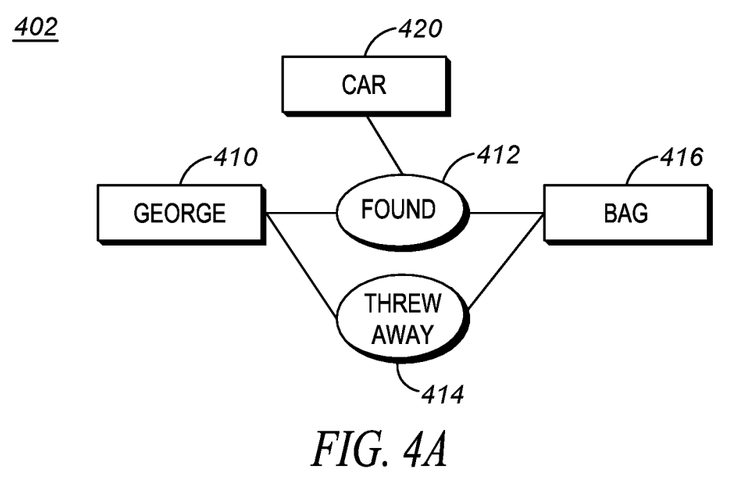
FIG. 4A illustrates an example first semantic processing of an uttered sentence or sentences from a first interviewee during an interrogation relative to an incident, in accordance with some embodiments.
Figure 4B:
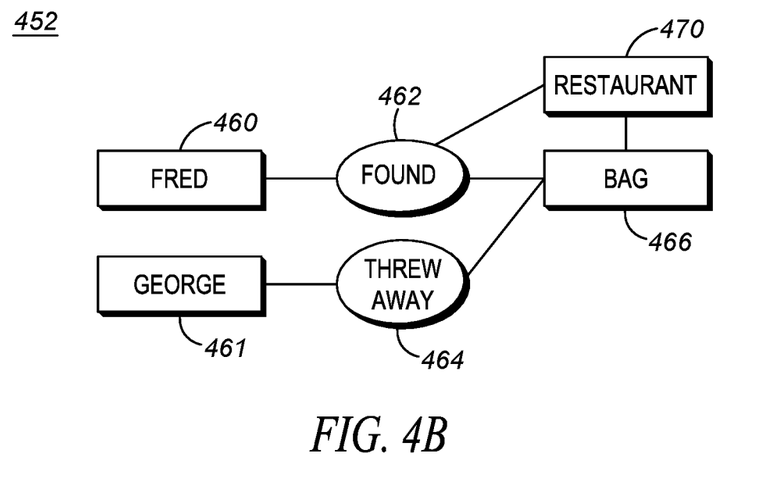
FIG. 4B illustrates an example second semantic processing of an uttered sentence or sentences from a second interviewee during an interrogation relative to an incident, in accordance with some embodiments.

At step 306, the computing device semantically processes the first digital text string to identify first information relative to the incident and store the first information. Semantically processing the first digital text string includes identifying key terms within the digital text string(s) created at step 304 and/or their relationships between one another. For example, and in one embodiment, semantically processing the first digital text string may include identifying one or more of nouns (including subjects and objects) and verbs in the first digital text string, and storing a digital representation of their relationships in the stored first information. The semantic processing may maintain the original sentence structure of the digital text string, and/or may identify pronouns in subsequent sentences linking subsequent sentences to prior sentences, and aggregate related sentences into single logical sentence structures in a newly created digital linked list or table format, among other possibilities. An example of this type of semantic processing is illustrated in FIGS. 4A and 4B.

For example, user 102 may be an interviewer interviewing interviewee 114, and the interviewee 114 may indicate during an interrogation that "George found the bag in the floor of his car. Then he threw it away when we got to the restaurant. It looked like a zip lock bag with brown stuff in it." Semantic processing of a corresponding digital text string may identify particular actors (nouns/subjects), particular actions taken (verbs), and particular things acted upon (nouns/objects) and create one or more linked-lists or tables identifying these semantic terms and their relationship, including identifying pronouns that refer to subjects, objects, and verbs across sentence punctuations. As set forth in FIG. 4A, the semantic processing of the sentence noted above may result in a linked list 402 or table that identifies "George" 410 as a subject/actor, identifies verbs associated with George 410 including "found" 412 and "threw away" 414, and identifies objects associated with each verb (object "car" 420 associated with verb found 412, and object "bag" associated with verbs found 412 and threw away 414).

Further, the user 122 may be an interviewer interviewing interviewee 134, and the interviewee 134 may indicate during an interrogation that "Fred found the bag at the restaurant, and I threw it away. I think it was a brown bag." As set forth in FIG. 4B, semantic processing of the corresponding digital text string may result in a digital linked list 452 or table that identifies "Fred" 460 as a first subject/actor, identifies a verb associated with Fred 460 including "found" 462, identifies an object associated with the verb found 462 including object "bag" 466 and a dependent clause "restaurant" associated with the verb found 462 (or alternatively with the object bag 466), identifies "George" as a second subject/actor, identifies a verb associated with George including "threw away" 464, and identifies an object associated with the verb threw away 464 including "bag" 466. Although FIGS. 4A and 4B show a linked-list format, a table format could be implemented as well in which each row of the table includes a set of one or more inter-related sentences or sentence portions, and columns separate each row into various sentence elements in a manner similar to the linked lists in FIGS. 4A and 4B.

Storing the semantically processed digital text string as first information relative to the incident may include storing the resultant linked list or table of related subjects, verbs, objects, and other sentence elements (e.g., clauses (dependent or independent), phrases, or modifiers (adjectives or adverbs)) in non-volatile memory. Additionally or alternatively, storing the semantically processed digital text string as first information may include tagging the digital text stream to identify the related subjects, verbs, objects, and other sentence elements within the digital text stream itself and storing the tagged digital text string in non-volatile storage. Other methods of creating and storing the first information could be used as well, such as comma-separated values or XML data structures. Additionally or alternatively, the computing device may wirelessly or wiredly transmit, via an ad-hoc or infrastructure wireless or wired connection, the stored first information associated with the first incident for further processing and storage by a second computing device. Prior to storing and/or transmitting the first information, the computing device may apply an electronic anti-tamper process to the stored first information to generate an anti-tamper indicator indicative of a tamper state of the stored first information and which can be applied in a separate process to verify whether data contained in the stored first information is modified after the anti-tamper indicator is generated, and the computing device may then store the anti-tamper indicator along with the first information. The anti-tamper process could be any one or more of a watermarking process that modifies or distorts or adds watermark data to the first information (e.g., video or audio watermarking, database watermarking, text watermarking) as the anti-tamper indicator that may be used in the future to authenticate the first information, a digital hashing process (e.g., message digest 5 (MD5) or secure hash algorithm 3 (SHA-3)) that generates a fixed-length message digest code as anti-tamper indicator, or a digital signing process that generates a digital signature as the anti-tamper indicator as a function of a public or private key (e.g., the digital signature algorithm (DSA), which may or may not make use of a public key infrastructure (PKI) for issuing and verifying identity certificates). Other anti-tamper methods could be implemented as well.

At step 308, the computing device accesses stored second information created via semantic processing of a second digital text string converted from a second digital audio and/or video stream captured via interrogation of a second interviewee (different from the first) under interrogation relative to the incident. The second information may have been created in a same or similar way as the first information, except at a different time (by the same or different audio and/or video capture device and/or computing device) or at a different location (by the same or different audio and/or video capture device and/or computing device) or via a different audio and/or video capture device and/or computing device. For example, while the user 102 and the interviewee 114 of FIG. 1 was used as an example for steps 302-306 to create the first information, the same steps 302-306 could be executed at another device (such as portable radio 124, RSM 126, or tablet device 127) to create the second information associated with the user 122 and interviewee 134 at a same or different location as where the first information was created and/or a same or different time as when the first information was created. The second information could then be stored at the another device, or transmitted via a wired or wireless ad-hoc or infrastructure link to another device for storage, including but not limited to the controller 156 in the wireless RAN 152.

Once the second information, associated with the same incident as the first information (e.g., each tagged with an identifier of the same incident, each embedded with an identifier of the same incident, or each stored in a same central location associated with the same incident, among other possibilities), is created, the device creating the second information may automatically provide the second information to every computing device associated with the incident (e.g., including the computing device executing method 300), may store the second information locally and make it available to the computing device executing method 300, or may transmit the information to another device which in turn provides the second information to the computing device executing method 300 or makes it available to the computing device executing method 300. Making the second information available to the computing device executing method 300 may include transmitting a message indicating the availability of the second information (perhaps including how to retrieve it), or merely responding to any inquiries or requests transmitted from the computing device executing method 300 for second information associated with an identified incident. In the event where the computing device executing method 300 is different from the another device generating the second information, the computing device executing method 300 may receive and/or retrieve the second information from the another device via one or more of a wired or wireless ad-hoc or infrastructure network connection.

In any event, at step 308, the computing device accesses stored second information (whether initially available locally or retrieved remotely and then stored locally) for use at step 310. At step 310, the computing device compares the first and second information and identifies a conflict between the stored first information and the stored second information. In one embodiment, identifying a conflict between the stored first information and the stored second information compares the semantically processed text in the first and second information to identify matching keywords, such as first matching subjects, objects, or verbs, and then comparing corresponding subjects, objects, or verbs relative to the matching subject, object, or verb to find a disagreement or lack of match. A database of synonyms or other term (or multiple term) replacements may also be accessed to identify those matching or conflicting subjects, objects, or verbs (or subject, object, or verb phrases) that, although they may or may not identically match, are known synonyms or other replacement terms such that a match or conflict should or should not be found. Furthermore, a database of negating terms, such as "not" or "non", may be accessed and compared to terms occurring before or after the matching terms to ensure that a negation is not present when finding first matching subjects, objects, or verbs, and accessed a second time to determine if there is a disagreement of lack of match in corresponding subjects, objects, or verbs.

For example, and with references to FIGS. 4A and 4B noted above, the statement from user 102 in FIG. 4A may include a subject match ("George" 410 in FIG. 4A and "George" 461 in FIG. 4B), may include a verb match relative to the subject match ("threw away" 414 in FIG. 4A and "threw away" 464 in FIG. 5B) and may include an object match relative to the subject and verb matches ("bag" 416 in FIG. 4A and "bag" 466 in FIG. 4B). Accordingly, and in this context, the computing device may refrain from finding a conflict at step 310 relative to the state of the matching object bag 416/466.

However, when exploring a different branch in the semantically processed text strings of first and second information in FIGS. 4A and 4B, the computing device may find a verb match (between "found" 412 and "found" 462) and an object match (between "bag" 416 and "bag" 466) but may find a subject mismatch or conflict between the subject relative to those matching objects and verbs of "George" 410 in FIG. 4A and "Fred" 460 in FIG. 4B.

In some embodiments, a relative confidence matching level in the conflict may be calculated by the computing device based on a number of other sentence elements that agreed/matched relative to the mismatch or conflict (in this case, finding that 2 out of 3 sentence elements matched, or a 66% match). A minimum threshold confidence matching level may be applied by the computing device at step 310 so that only those mismatches or conflicts that otherwise match a minimum threshold amount are raised to an interviewer (first and/or second) to follow-up on during the one or more real-time interrogations. In some other embodiments, additional sentence elements could be used to find matches and mismatches and to calculate confidence matching levels, including clauses, phrases, and modifiers, among other sentence elements.

Additionally or alternatively, other context information, in addition to the sentence elements noted above, could be used to identify matches or conflicts and/or to calculate confidence matching levels. For example, a time window of occurrence relative to a keyword or sentence element (such as a subject, object, or verb noted above) may be used at step 310. As one example, and with reference to FIGS. 4A and 4B, in the event that the interviewee 114 stated that George 410 threw away 414 the bag 416 sometime between 4-6 pm, and the interviewee 134 stated that George 461 threw away 464 the bag 466 between 8-9 pm, the computing device may calculate a confidence matching level of 75% (i.e., three out of four sentence elements matching) and identify a time window conflict between the two statements.

Identifying a conflict between the stored first and stored second information at step 310 may further include comparing keywords and/or sentence elements after applying an incident-type conflict filter to the first and second information to prioritize some keywords or sentence elements over others, and/or to discard low priority or high-noise keywords or sentence elements that are unlikely to lead to additional information for the specified type of incident. The type of incident may be specified at the computing device by one of the first and second user 102, 122, or may be stored in metadata associated with or embedded in the first and/or second information, among other possibilities. For example, if the incident under investigation and interrogation is a car accident, certain terms such as "stop light," "color," "speed," and "time of day" may be prioritized for conflict identification purposes over other keywords. These prioritized conflicts may be played back first to the user 102/interviewer over other less prioritized conflicts or may be played back in a modified form or style (e.g., amplified in auditory volume or highlighted in text, among other possibilities) to emphasize their relative priority relative to other conflicts.

At the same time, keywords or sentence elements known to cause false positives (false conflicts) or keywords or sentence elements of low investigative value relative to the car accident incident type may be discarded (e.g., the terms themselves discarded from the first and/or second information or identified conflicts including those keywords or sentence elements discarded after a conflict is found). Example keywords or sentence elements that may be of low value in a car accident incident context may include "hair color," "mom," "dad," "radio station," etc.

Low value conflicts (and conflicts having a calculated confidence matching level below the threshold for that matter as well) may still be identified in a separate text file or embedded in the first and/or second information and stored at the computing device, but may not be played back to the user 102/interviewer at step 310 in real-time during the interrogation.

Once a conflict is identified at step 310, the computing device may then responsively generate a visual or auditory prompt, via a display or speaker (or via some other mode via some other element), and play back an indication of the identified conflict to the first interviewer via the visual or auditory prompt in real-time. For example, the display may be a display integrated with the computing device, or a display of a mobile phone or tablet device associated with the user 102/interviewer and coupled to the computing device via a short-range or long-range wireless transceiver, or wired transceiver, among other possibilities, and which may display text of the identified conflict between the first and second information. Additionally or alternatively, a speaker integrated in the computing device, or an audio earpiece or headphones communicably coupled to the computing device via a short-range or long-range wireless transceiver, or wired transceiver, among other possibilities, may be caused to play back audio identifying the conflict.

The text displayed, or the audio played back, identifying the conflict may include portions of the linked-list or table from the first and second informations in which the conflict was found, may include the underlying full sentence structures from the first and second digital text strings from which the first and second information was generated, and which may be stored at the computing device and/or elsewhere and made accessible to the computing device, and/or may include an additional threshold amount of information before and/or after the point in the first and second information in which the conflicting information was found to provide the interviewer with additional context information. The amount of additional context information may include one or two entries occurring before and/or after the conflicting entries in the first and/or second informations, and/or may include one or two full sentences occurring before and/or after the conflicting sentences in the respective digital text strings associated with the conflicting entries in the first and/or second informations (linking information linking the first and/or second information to the underlying first and second digital text strings stored accompanying the first and second information, or in a separate data store mapping).

As just one example, the generated visual or audio prompt may include aggregating the matching subject, object, or verb and the conflicting other one of subjects, objects, or verbs from the first and second stored information and playing back, via a display or speaker, the matching subject, object, or verb and the conflicting other one of subjects, objects, or verbs from the first and second stored information, perhaps including some additional threshold disclosure for context.

In an embodiment in which only the first interviewer is interrogating the first interviewee relative to the incident during method 300, the computing device may be the only device to prompt an interviewer in real-time relative to the conflict. However, an indication of the conflict may otherwise be noted and transmitted back to a central server location, such as controller 156 of FIG. 1, and/or may be transmitted (by the computing device) or forwarded (by the central server) to a computing device associated with the second interviewer (if it can be identified at the computing device via metadata associated with first or second information, information embedded within the first or second information, or information stored at the controller 156) for future follow-up.

In an embodiment in which both the first interviewer is interrogating the first interviewee and the second interviewer is interrogating the second interviewee relative to the incident during method 300 both in real-time, the computing device and another computing device associated with the second interviewer may both prompt respective interviewers in real-time relative to the identified conflict. The another computing device may be notified of the conflict by the computing device itself in a manner similar to that set forth above, or the another computing device may be executing steps 302-310 in parallel with the computing device and may access the first information generated by the computing device as "second information" as it is identified at step 308 when executing method 300 at the another computing device and accordingly provide the same or similar visual or auditory prompt.

In addition to the visual or auditory prompt set forth above, a haptic alert could be provided to the first and/or second interviewer via a corresponding haptic-enabled device (such as a mobile radio or mobile phone associated with the first and/or second interviewer) when a conflict is identified and could be used to instruct the first and/or second interviewer to further inspect a display device for text corresponding to the conflict or to equip a pair of earphones or earplugs to hear audio playback relative to the conflict. Still further, augmented or mixed reality headsets or glasses could be used to display the conflict in a field of view of the first and/or second user.

At or after step 310, additional metadata associated with the real-time conflict identification and resolution during an interrogation process may be further captured by the computing device and stored for subsequent evidentiary use. For example, the interviewer may provide an indication (e.g., via a user interface of the computing device or some other communicably coupled device) regarding whether a conflict played back to the interviewer by the computing device was actually raised to the interviewee, so that subsequent off-line analysis and follow-up can determine which conflicts identified via method 300 where followed-up on and which were not. This indication regarding the identified and played back conflict could be stored at the computing device and/or transmitted back to a central server such as controller 156 for further storage and distribution. Additional metadata associated with the real-time conflict identification and resolution during an interrogation process may include, but is not limited to, one or more of an identifier of the interviewer (such as an officer or other government official) conducting the interrogation, an identifier of the interviewee participating in the interrogation, a determined geo-location of the computing device and/or the audio and/or video capture device, a date stamp identifying a current date, and one or more time stamps identifying start and/or stop times associated with the interrogation. Other metadata could be included as well. This metadata could similarly be stored at the computing device and/or transmitted back to a central server such as controller 156 for further storage and distribution.

During or after step 310, or as a separate corroboration step in which step 310 of FIG. 3 of method 300 is replaced with a corroboration step, the computing device may also function to identify an information hole in one or both of the first and second information, such as by identifying a matching first keyword or sentence element in both the first and the second information, and a corresponding second keyword or sentence element in one of the first and second information that modifies or further defines the matching first keyword or sentence element that doesn't exist in the other of the first and second information (the second keyword or sentence element being defined as an information hole in the other of the first and second information). Essentially, this method can be used to trigger the interviewer to corroborate (or fail to corroborate, depending on the response from the interviewee) information appearing only in one of the first and second information but not the other or information that is determined to be lacking based on a determined incident type (e.g., the information hole). Accordingly, a first information hole (corroboration) process can re-use steps 302-308 of method 300 of FIG. 3, replacing existing step 310 with a step of identifying an information hole between the stored first information and the stored second information, responsively generating a visual or auditory prompt, via a display or speaker, and playing back an indication of the information hole to the first interviewer via the visual or auditory prompt in order to cause the first interviewee to corroborate (or not corroborate) information appearing in one of the first and second information but not the other. Still further, a second information hole (template) process can re-use steps 302-308 of method 300 of FIG. 3, replacing existing step 310 with a step of identifying an information hole between the stored first information (and/or the stored second information) relative to an information template dependent upon an incident type, responsively generating a visual or auditory prompt, via a display or speaker, and playing back an indication of the information hole to the first interviewer via the visual or auditory prompt in order to cause the first interviewee to fill in (or not fill in) missing information from the incident-type-dependent information template.

For example, the matching first keyword or sentence element may be a matching one of a subject, object, verb, or time/time window occurring in both the first and second information, and the second keyword or sentence element may be an associated other one of a subject, object, verb, or time/time window relative to the matching subject, object, verb, or time/time window existing in only one of the first and second information. Responsive to identify the information hole, the computing device may similarly responsively generate a second visual or audio prompt, via a corresponding display or audio-output device communicatively coupled to the computing device, and play back an indication of the information hole via the second visual or audio prompt to the first interviewer (and, similar to the description noted above with respect to conflicts, in parallel to a second interviewer if both interrogations are occurring contemporaneously). In some embodiments, the visual or audio prompt may only be played back to the interviewee associated with the first or second information having the information hole, while in other embodiments, it may be played back to both interviewees for confirmation purposes. The indication of the information hole may include the matching first keyword or sentence, and the second keyword or sentence element, including some additional threshold context information similar to that noted above with respect to conflicts.

As one example, and using the first and second information respectively set forth in FIGS. 4A and 4B again, (after the semantic processing noted above), the computing device may identify, via the stored second information representing the interrogation of interviewee 134 via user 122, "Fred" 460 as a subject/actor, "found" 462 as a corresponding verb, and "restaurant" 470 as a corresponding object relating to "found" 462 and "bag" 466 in a stored second information. The computing device may identify, via the stored first information representing the interrogation of interviewee 114 by user 102, a matching verb "found" 412, a matching object "bag" 416, but a missing keyword or sentence element "restaurant" corresponding to the verb "found" 412, a matching object "bag" 416. The computing device may responsively generate a visual or audio prompt, via a corresponding display or audio-output device communicatively coupled to the computing device, and play back an indication of the information hole (here, the lack of a "restaurant" in the interviewee's 114 text), and may include additional context including the subject "Fred" 460, the verb "found" 462, and the object "bag" 466 from the second information, among potential additional context information. In this manner, the interviewer user 102 can receive a digital auditory or visual indication of the information hole, and incorporate such information into further questioning of the interviewee 114 in real-time. Further action could also be taken by the another computing device generating the second information to confirm the information hole via the user 122 and interviewee 134. Other possibilities exist as well.

In still another example, stored information templates may be provided specific to different incident types, and as the first and/or second information is generated from first and/or second interviewees, and information elements of an information template associated with the particular incident type are filled in, one or more information holes (e.g., missing information elements in the template) could be identified and raised in a manner similar to step 310 to the first and/or second interviewer in real-time. For example, using the FIGS. 4A and 4B statements above and assuming the incident type is an illegal drug-related infraction, an incident-specific information template including information elements such as location of sale, location of apprehension, identity of seller, identity of sellee, type of illegal drug being offered for sale, original source for drug, etc. In this case, for example, and assuming that the first and second information failed to identify the type of drug being offered for sale, the computing device may responsively generate a visual or audio prompt, via a corresponding display or audio-output device communicatively coupled to the computing device, and play back an indication of the information hole (here, the lack of a "type of drug" information element in the drug-related infraction incident type information template). In this manner, the interviewer user 102 can receive a digital auditory or visual indication of the information hole, and incorporate such information into further questioning of the interviewee 114 in real-time. Further action could also be taken by the another computing device generating the second information to confirm the information hole via the user 122 and interviewee 134. Once a response to the questioning is provided by the interviewee and detected at the computing device, the corresponding information elements of the information template could be populated, and other missing information elements (information holes) identified. Other possibilities exist as well.

3. Conclusion

In accordance with the foregoing, a method, device, and system for improved real-time conflict identification and resolution, and information corroboration, during an interrogation relative to an incident is disclosed. As a result of the foregoing, conflicts between prior or in-parallel interrogations associated with a same incident can be semantically identified and caused to be played back in real-time to an interviewer during an interrogation of an interviewee via an electronic playback device, resulting in improved information gathering, reduced time spent revisiting witnesses, and improved evidentiary preservation of digital interrogation media and semantic information, providing a technical solution to a difficult and complex technical problem existing in the art.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Still further, the enclosed description of semantic analysis based on subject, verbs, and objects has been somewhat simplified to describe the overall method. Those practiced in the art will appreciate that a number of more sophisticated natural language processing (NLP) and semantic analysis techniques could further be applied to the tasks and examples set forth above. For example, further analysis of adjectives, adverbs, and other language elements could be used to identify qualifications, degrees of confidence, ambiguity, disambiguation, the need for disambiguation questions, synonym/opposite determination based on more complex phrases, and more. Additional database sources for further understanding entities and actions could also be leveraged. Models of language dialects and colloquialisms could be used, and different semantic models could be applied to different languages. Further interpretations based on social media analysis for understanding trending terminology, and other similar methods are anticipated as well.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for improved real-time conflict identification and resolution during an interrogation relative to an incident, the method comprising:

capturing, at an audio and/or video capture device communicatively coupled to a computing device, a first real-time digital audio or video stream from a first interviewee under interrogation by a first interviewer relative to an incident;

converting, by the computing device, the first real-time digital audio or video stream to a first digital text string;

semantically processing, by the computing device, the first digital text string to identify first information relative to the incident and storing the first information;

determining, by the computing device, in real-time during the interrogation of the first interviewee, that a second interviewee is under interrogation by a second interviewer relative to the incident, and responsively accessing, by the computing device, stored second information created via semantic processing of a second digital text string converted from a second real-time digital audio or video stream captured by a second computing device via interrogation of the second interviewee under interrogation relative to the incident;

identifying, via the computing device, a conflict between the stored first information and the stored second information relative to the incident, and responsively (i) generating a visual or audio prompt, via a corresponding display or audio-output device communicatively coupled to the computing device, and playing back an indication of the conflict via the visual or audio prompt in real-time to the first interviewer during the interrogation of the first interviewee relative to the incident, and (ii) causing the second computing device to generate a second visual or audio prompt, via a corresponding display or audio output device communicatively coupled to the second computing device and playback an indication of the conflict via the second visual or audio prompt in real-time to the second interviewer during the interrogation of the second interviewee relative to the incident.

2. The method of claim 1, wherein the audio and/or video capture device is a body camera fixed to the first interviewer, and the display or audio-output device is a third computing device with an electronic display associated with the first interviewer or an audio earpiece associated with the first interviewer.

3. The method of claim 1, wherein accessing the stored second information comprises accessing a local storage device at the computing device.

4. The method of claim 1, wherein accessing the stored second information comprises retrieving the second information, via one of an ad-hoc and infrastructure wireless connection, at the second computing device associated with the second interviewer.

5. The method of claim 1, wherein accessing the stored second information comprises retrieving the second information, via an infrastructure wired or wireless connection, at a second infrastructure computing device.

6. The method of claim 1, further comprising wirelessly or wiredly transmitting, via an ad-hoc or infrastructure wireless or wired connection, the stored first information associated with the incident for further processing and storage by the second computing device.

7. The method of claim 1, further comprising applying, by the computing device, an electronic anti-tamper process to the stored first information to generate an anti-tamper indicator indicative of a tamper state of the stored first information and which can be applied in a separate process to verify whether data contained in the stored first information is modified after the anti-tamper indicator is generated, and storing the anti-tamper indicator along with the first information.

8. The method of claim 1, wherein semantically processing the first digital text string comprises identifying subjects, objects, and verbs in the first digital text string, and storing a digital representation of their relationships in the stored first information; and
wherein identifying a conflict between the stored first information and the stored second information comprises identifying a matching subject, object, or verb but associated conflicting other one of subject, object, or verb relative to the matching subject, object, or verb between respective stored first information and the stored second information.

9. The method of claim 8, wherein generating the visual or audio prompt comprises aggregating the matching subject, object, or verb and the conflicting other one of subjects, objects, or verbs from the first and second stored information and playing back, via a display or speaker, the matching subject, object, or verb and the conflicting other one of subjects, objects, or verbs from the first and second stored information.

10. The method of claim 8, wherein identifying a matching subject, object, or verb between the stored first information and the stored second information comprises identifying a first term, or set of terms, in the stored first information and a second term, or set of terms, in the stored second information different from the first term, or set of terms, but that is determined to be a synonym of the first term, or set of terms.

11. The method of claim 8, wherein identifying the matching subject, object, or verb between the stored first information and the stored second information or the associated conflicting other one of subject, object, or verb relative to the matching subject, object, or verb comprises accessing a database of negating terms in correspondingly determining if a match or disagreement is present.

12. The method of claim 1, wherein identifying the conflict between the stored first information and the stored second information comprises identifying a type of incident of the incident, and applying different conflict filters to the stored first and second information based on the type of incident; and
wherein the different conflict filters prioritize or discard particular subject, object, and verb disagreements relative to the type of incident.

13. The method of claim 1, wherein semantically processing the first digital text string comprises identifying at least one of subjects, objects, and verbs and identifying times or time windows of occurrence relative to the at least one of subjects, objects, and verbs in the first digital text string, and storing a digital representation of their relationships in the stored first information; and
wherein identifying a conflict between the stored first information and the stored second information comprises identifying a matching at least one of subject, object, or verb but associated conflicting time or time window of occurrence relative to the matching at least one of subject, object, or verb between respective stored first information and the stored second information.

14. The method of claim 1, wherein semantically processing the first digital text string comprises identifying subjects, objects, verbs, and time in the first digital text string, and storing a digital representation of their relationships in the stored first information;
the method further comprising:
identifying an information hole in the stored first information relative to the stored second information comprising identifying a matching subject, object, verb, or time, identifying an existence of an associated other one of subject, object, verb, or time relative to the matching subject, object, verb, or time in the stored second information, and identifying a lack of the associated other one of subject, object, verb, or time relative to the matching subject, object, verb, or time in the stored first information; and
responsively generating a third visual or audio prompt, via a corresponding display or audio-output device communicatively coupled to the computing device, and playing back an indication of the information hole via the third visual or audio prompt to the first interviewer.

15. The method of claim 14, wherein the indication of the information hole includes an indication of the matching subject, object, verb, or time in the stored second information and an indication of the associated other one of subject, object, verb, or time relative to the matching subject, object, verb, or time in the stored second information.

16. The method of claim 15, wherein the indication of the information hole is expanded to include a predetermined threshold amount of additional context before and after the associated other one of subject, object, verb, or time relative to the matching subject, object, verb, or time in the stored second information.

17. The method of claim 1, further comprising:
responsive to identifying the conflict between the stored first information and the stored second information relative to the incident and further responsive to generating the visual or audio prompt, providing a haptic alert, via a corresponding haptic-enabled device communicatively coupled to the computing device, in real-time to the first interviewer during interrogation of the first interviewee relative to the incident, wherein the haptic alert instructs the first interviewer to (i) inspect the corresponding display device for text corresponding to the conflict, or (ii) equip the audio-output device to hear audio playback relative to the conflict.

18. The method of claim 1, further comprising:
identifying, via the computing device, a second conflict between the stored first information and the stored second information relative to the incident;
generating a third visual or audio prompt, via the corresponding display or audio-output device communicatively coupled to the computing device;
determining, based on a type of incident of the incident, whether the second conflict is to be prioritized for play back over the first conflict; and
responsive to determining that the second conflict is to be prioritized for playback over the first conflict, playing back an indication of the second conflict via the third visual or audio prompt in real-time to the first interviewer during the interrogation of the first interviewee relative to the incident, such that, (i) the indication of the second conflict is played back prior to the indication of the first conflict, or (ii) the indication of the second conflict is amplified in auditory volume relative to the indication of the first conflict, or (iii) the indication of the second conflict is highlighted in text relative to the indication of the first conflict.

19. A method for improved real-time conflict identification and resolution during an interrogation relative to an incident, the method comprising:
capturing, at an audio and/or video capture device communicatively coupled to a computing device, a first real-time digital audio or video stream from a first interviewee under interrogation by a first interviewer relative to an incident;
converting, by the computing device, the first real-time digital audio or video stream to a first digital text string;
semantically processing, by the computing device, the first digital text string to identify first information relative to the incident and storing the first information;
accessing, by the computing device, stored second information created via semantic processing of a second digital text string converted from a second digital audio or video stream captured via interrogation of a second interviewee under interrogation relative to the incident;
identifying, via the computing device, a conflict between the stored first information and the stored second information relative to the incident, and responsively generating a visual or audio prompt, via a corresponding display or audio-output device communicatively coupled to the computing device, and playing back an indication of the conflict via the visual or audio prompt to the first interviewer,
wherein semantically processing the first digital text string comprises identifying subjects, objects, verbs, and time in the first digital text string, and storing a digital representation of their relationships in the stored first information;
the method further comprising:
identifying an information hole in the stored first information relative to the stored second information comprising identifying a matching subject, object, verb, or time, identifying an existence of an associated other one of subject, object, verb, or time relative to the matching subject, object, verb, or time in the stored second information, and identifying a lack of the associated other one of subject, object, verb, or time relative to the matching subject, object, verb, or time in the stored first information; and
responsively generating a second visual or audio prompt, via a corresponding display or audio-output device communicatively coupled to the computing device, and playing back an indication of the information hole via the second visual or audio prompt to the first interviewer,
wherein the indication of the information hole includes an indication of the matching subject, object, verb, or time in the stored second information and an indication of the associated other one of subject, object, verb, or time relative to the matching subject, object, verb, or time in the stored second information,
wherein the indication of the information hole is expanded to include a predetermined threshold amount of additional context before and after the associated other one of subject, object, verb, or time relative to the matching subject, object, verb, or time in the stored second information, and
wherein the predetermined threshold amount of additional context is a full sentence before and a full sentence after the sentence in which the associated other one of subject, object, verb, or time relative to the matching subject, object, verb, or time appears in the stored second information.

20. A method for improved real-time conflict identification and resolution during an interrogation relative to an incident, the method comprising:
capturing, at an audio and/or video capture device communicatively coupled to a computing device, a first real-time digital audio or video stream from a first interviewee under interrogation by a first interviewer relative to an incident;
converting, by the computing device, the first real-time digital audio or video stream to a first digital text string;
semantically processing, by the computing device, the first digital text string to identify first information relative to the incident and storing the first information;
accessing, by the computing device, stored second information created via semantic processing of a second digital text string converted from a second digital audio or video stream captured via interrogation of a second interviewee under interrogation relative to the incident; and
identifying, via the computing device, a conflict between the stored first information and the stored second information relative to the incident, and responsively generating a visual or audio prompt, via a corresponding display or audio-output device communicatively coupled to the computing device, and playing back an indication of the conflict via the visual or audio prompt to the first interviewer,
wherein playing back an indication of the conflict via the visual or audio prompt comprises identifying a point of conflict between the stored first information and the stored second information relative to the incident, aggregating sentence information from respective sentences in which the conflict is identified with additional context information comprising a predetermined threshold amount of additional context before and after the respective sentences in which the conflict is identified, and causing the aggregated sentence information to be played back via the visual or audio prompt to the first interviewer.

21. A computing device for providing improved real-time conflict identification and resolution during an interrogation relative to an incident, the computing device comprising:

a memory storing non-transitory computer-readable instructions;

a transceiver; and one or more processors configured to, in response to executing the non-transitory computer-readable instructions, perform a first set of functions comprising:

capture, via an audio and/or video capture device communicatively coupled to the computing device, a first real-time digital audio or video stream from a first interviewee under interrogation by a first interviewer relative to an incident;

convert the first real-time digital audio or video stream to a first digital text string;

semantically process the first digital text string to identify first information relative to the incident and store the first information;

determine, in real-time during the interrogation of the first interviewee, that a second interviewee is under interrogation by a second interviewer relative to the incident, and responsively access stored second information created via semantic processing of a second digital text string converted from a second real-time digital audio or video stream captured by a second computing device via interrogation of the second interviewee under interrogation relative to the incident; and identify a conflict between the stored first information and the stored second information relative to the incident, and responsively (i) generate a visual or audio prompt, via a corresponding display or audio-output device communicatively coupled to the computing device, and play back an indication of the conflict via the visual or audio prompt in real-time to the first interviewer during the interrogation of the first interviewee relative to the incident, and (ii) cause the second computing device to generate a second visual or audio prompt, via a corresponding display or audio output device communicatively coupled to the second computing device and playback an indication of the conflict via the second visual or audio prompt in real-time to the second interviewer during the interrogation of the second interviewee relative to the incident.

* * * * *